United States Patent
Eicke et al.

(10) Patent No.: US 11,399,655 B2
(45) Date of Patent: Aug. 2, 2022

(54) BEVERAGE MAKER

(71) Applicant: WMF GROUP GMBH, Geislingen (DE)

(72) Inventors: Joel Eicke, Ulm (DE); Frank Goeltenboth, Senden (DE); Rolf Staeb, Nellingen (DE)

(73) Assignee: WMF GMBH

( * ) Notice: Subject to any disclaimer, the term of this patent is extended or adjusted under 35 U.S.C. 154(b) by 917 days.

(21) Appl. No.: 15/998,550

(22) PCT Filed: Feb. 13, 2017

(86) PCT No.: PCT/EP2017/053148
§ 371 (c)(1),
(2) Date: Oct. 16, 2018

(87) PCT Pub. No.: WO2017/140618
PCT Pub. Date: Aug. 24, 2017

(65) Prior Publication Data
US 2021/0315414 A1    Oct. 14, 2021

(30) Foreign Application Priority Data
Feb. 15, 2016    (DE) ..................... 10 2016 202 257.1

(51) Int. Cl.
*A47J 31/52*    (2006.01)
*A47J 31/44*    (2006.01)
*A47J 31/46*    (2006.01)

(52) U.S. Cl.
CPC ....... *A47J 31/5251* (2018.08); *A47J 31/4403* (2013.01); *A47J 31/462* (2013.01)

(58) Field of Classification Search
CPC ................ A47J 31/5251; A47J 31/4403; A47J 31/5253; A47J 31/5255; A47J 31/462;
(Continued)

(56) References Cited

U.S. PATENT DOCUMENTS

2015/0245736 A1*   9/2015   Reyhanloo ............ A47J 31/605
                                                     426/231

FOREIGN PATENT DOCUMENTS

CN           104582547 A    4/2015
WO          9827852 A1    7/1998
(Continued)

OTHER PUBLICATIONS

International Search Report issued in PCT/EP2017/053148 dated Apr. 18, 2017.
(Continued)

*Primary Examiner* — Phuong T Nguyen
(74) *Attorney, Agent, or Firm* — Gesmer Updegrove LLP (57) ABSTRACT

A beverage maker, in particular an electrically operated coffee machine having a water tank, which can be filled with water which can be used to prepare a beverage by means of the beverage maker,
    wherein the beverage maker is configured as connectable to a drinking water network via an inflow, characterized in that the water tank can be manually removed from the beverage maker by a user of the beverage maker in a state in which the beverage maker is connected to the drinking water network via the inflow and/or can be filled with the water selectively by manual filling of water by a/the user of the beverage maker or by introducing drinking water from the drinking water network via the inflow.

13 Claims, 7 Drawing Sheets

(58) Field of Classification Search
CPC ........ A47J 31/401; A47J 31/465; A47J 31/56; A47J 31/461
USPC .......... 99/275, 279, 280, 282, 283, 295, 330
See application file for complete search history.

(56) References Cited

FOREIGN PATENT DOCUMENTS

| | | |
|---|---|---|
| WO | 199827852 | 7/1998 |
| WO | 2005077232 | 8/2005 |

OTHER PUBLICATIONS

German Office Action dated Jan. 24, 2017 in related German Application No. DE 10 2016 202 257.1.
Office Action issued by the Chinese Patent Office dated Nov. 5, 2019 in related Application No. 201780011651.2.

* cited by examiner

BEVERAGE MAKER

PRIORITY INFORMATION

This application is a 371 of PCT Application No. PCT/EP2017/053148 filed Feb. 13, 2017, which claims the benefit of German Application No. 10 2016 202 257.1 filed Feb. 15, 2016, their contents and substance of which are herein incorporated by reference.

The present invention relates to a beverage maker in accordance with the preamble of claim 1. The beverage maker in accordance with the invention can in particular be an electrically operated coffee machine (preferably a fully automatic coffee machine). Although the present invention will specifically be described in the following for the example of an (electrically operated) coffee machine, other beverage makers, for example electrically operated automatic brewers for brewing various beverage specialties such as instant soups, teas, . . . , are also covered in accordance with the invention.

It makes sense in catering to provide a beverage maker such as a coffee machine with a mains water connection from a certain number of cups per day (where appropriate also for reasons of comfort). The beverage maker (also simply called a machine in the following) is thus permanently supplied with water so that a tank of the beverage maker does not constantly have to be refilled at a faucet by the user. It frequently occurs that a catering business is not certain prior to making a purchase whether a machine with a tank or with a mains water connection should be purchased. A retrofitting of an already purchased machine to the respective other technique is, however, very complex and/or expensive since it is associated with a conversion of the machine by a service engineer (or it may even no longer be possible at all for design reasons).

As a rule, a purchasing business thus decides whether a mains water machine or a tank machine should be purchased when purchasing a machine. A mixed operation in which the same machine is e.g. operated at the mains water system or drinking water system in a restaurant or breakfast room and, when necessary is also operated as a tank machine independently or not connected to the drinking water system (e.g. in a conference room or beer garden) is in particular not possible.

A mains water machine is known from the prior art (EP 2 702 908 A1) that has a fixedly installed tank, that is a tank that cannot be removed manually. The tank serves as a fixedly installed buffer that is filled via the mains water connection.

Starting from the prior art, it is the object of the invention to provide a beverage maker that combines the advantages of a mains water machine with the advantages of a tank machine. It is furthermore an object that this beverage maker should be operable in a simple and quiet manner, with it advantageously also being made possible to keep the machine clean in a simple manner.

This object is achieved by a beverage maker in accordance with claim 1 and by a mains water kit for such a beverage maker in accordance with claim 14. Advantageous embodiment variants can be seen from the dependent claims.

The present invention will be described in the following for the example of an electrically operated coffee machine (specifically: a fully automatic coffee machine). A general description will be provided first and then a description of an embodiment in detail. In accordance with the invention, however, automatic beverage machines are also covered that serve the preparation of other beverages that require water (e.g. beverage makers for hot beverages and cold beverages in the form of tea, instant soup, syrup beverages, chocolate-based beverages, etc.).

A beverage maker, coffee machine, or fully automatic coffee machine in accordance with the invention is described in claim 1. Since the basic design of such machines is familiar to the skilled person (see, for example, the electric coffee machines described in CH 706 100 A1 or in DE 10 2014 212 645 A1), only those features of the beverage maker in accordance with the invention will be described in the following for the example of a coffee machine that are important for the understanding of the present invention.

The drinking water network is in particular a mains network of a building to which the machine in accordance with the invention can be connected for the taking of drinking water or for introducing drinking water into the machine via suitable connection elements (hydraulic plug-in connections, valves such as angle valves, tube elements, etc.). The drinking water network in accordance with the present invention can, however, also be a water supply that comprises a larger storage container and a pressure boosting system. (In the drinking water network in accordance with the invention, the supplied water is generally pressurized and does not have to be sucked in).

It is in particular understood by a manual filling (such as a pouring in with the aid of an external vessel such as a jug) that the inflow of the beverage maker that connects the beverage maker to the drinking water network is not used to fill the water tank, but rather that the tank is e.g. taken out of a housing of the beverage maker and is e.g. filled with (drinking) water at its upper side via a water faucet or using a measuring jug.

The beverage maker in accordance with the invention can thus in particular be configured such that the water tank can still be filled manually in a non-connected state (e.g. when it has been taken from the building into the garden for a festivity). The latter can in particular take place in that the water tank is manually removed from the housing of the machine by the user and is e.g. held under a faucet in the building or outside the building (or is filled by pouring by means of a transport vessel for water).

Advantageously implementable features can be seen from claim 2.

Further advantageously implementable features can be seen from claim 3. The switching (in the connected state) between the two modes of operation can take place manually by the user via a suitable input possibility at a housing of the beverage maker (e.g. via a touch screen or a press button at the housing). However, an automated switching is equally possible in this state (program-controlled via the control device). For example, a switch can always automatically be made to the second mode of operation when the control device determines that the connected state is present. The control device can comprise a microcontroller having a memory and a correspondingly designed control program stored therein. The determination whether the connected state or the non-connected state is present can take place via a connection sensor (or also via a presence sensor).

The second mode of operation can be established in a variety of manners by suitable control programs in the memory of the control device. At least one level sensor can thus be provided at the water tank, for example, that detects the level in the water tank. The current level can be transmitted from the sensor to the control device and the control device can control the filling of the water tank in the second mode of operation on the basis of the transmitted data values so that the water tank is always filled at intervals after predefined time intervals with so much drinking water from the drinking water network that a maximum level is reached in the water tank. It is, however, equally also conceivable to control the second mode of operation such that fresh water is always only filled into the tank from the drinking water network when water is simultaneously taken from the tank (during the preparation of a beverage by the beverage maker). See also the following examples in this respect.

Further advantageously implementable features can be seen from claim 4. The features of this claim (this also applies to all the further dependent claims) can be combined as desired with features of other dependent claims within the framework of the present claim structure.

Accommodating the water tank in the housing is understood such that the water tank can be or is positioned at least sectionally, preferably completely within a volume surrounded by the housing (for example in that the tank is pushed into the housing, e.g. into a tank receiver of the housing).

Further advantageously implementable features can be seen from claim 5.

The electrical connector can be configured as a plug, with the beverage maker (in particular: its housing) being able to have a connection socket complementary thereto to receive this plug. The connection socket can be connected to the control device by means of an electrical data and control line that is preferably (but not necessarily) bidirectional so that the control device can control and/or regulate functions of the mains water kit (in particular: a flow regulator and/or a valve thereof). For cost reasons, the electrical data and control line can be a simple electrical line via which the valve either has current applied or not (the valve can then be a simple valve that opens or closes by an application or non-application of current).

The mains water kit can have a further hydraulic connector by which it can be hydraulically connected to the drinking water network at its side remote from the beverage maker, i.e. at its upstream side on the construction side (for example in a building in which the beverage maker is installed). The further hydraulic connector of the mains water kit can, for example, be fastened to a hydraulic connector of the drinking water network, e.g. to a valve (e.g. to an angle valve), to a water faucet or to a stopcock or the like of the drinking water network.

The mains water kit can equally have a further mechanical connector to which it can be mechanically connected at its side remote from the beverage maker, i.e. at its upstream side on the construction side (for example at the wall of a house in which the beverage maker is installed).

The connection between the mains water kit and the drinking water network can be configured as a mechanically securable, hydraulic plug-in connection.

The water tank can form a section of the housing of the beverage maker and can at least partly comprise the connectors at the beverage maker side (i.e. the hydraulic, mechanical and/or electrical connector). It is, however, equally possible that all (or some) of said connectors at the beverage maker side are formed at another housing section of the beverage maker, e.g. at a base group of the housing of the beverage maker (with the hydraulic connector of the mains water kit then being able to establish the hydraulic connection to the water tank via a further water line running in the housing interior of the beverage maker). This variant is shown in the following embodiment.

The two mutually complementary hydraulic connectors, that is, the hydraulic connector of the housing and the hydraulic connector of the mains water kit, can be configured as a hydraulic plug-in connection that can additionally be mechanically secured (for example via a screw connection).

In accordance with claims 4 and 5, drinking water can then be introduced from the drinking water network via the mains water kit into the water tank of the beverage maker when the beverage maker is hydraulically connected to the drinking water network via the inflow. The mains water kit can here be a part of the inflow completely as a component (that is, with all of its individual elements) and said inflow can in turn be a part of the beverage maker as a component (that is, with all of its individual elements). It is, however, equally possible (cf. also the following example) that only individual elements of the inflow belong to the beverage maker, while other individual elements of the inflow belong to a mains water kit completely separate from the beverage maker (that is, they belong to a mains water kit external to the beverage maker). Such a mains water kit external to the beverage maker is then formed as connectable to the beverage maker.

It is possible that the components of the inflow belonging to the beverage maker comprise the hydraulic connector of the housing and the further water line (within the housing) for the connection of the water tank (and optionally also a mechanical connector and/or an electrical connector at the housing of the beverage maker), with the mains water kit being a component external to the beverage maker (possible also external to the inflow) comprising a plurality of individual elements. The latter then represents a unit that is configured for a hydraulic connection (and preferably also for a mechanical connection and for an electrical connection) to the housing of the beverage maker. A hydraulic connection that serves the water supply from the drinking water network into the beverage maker (that is into the water tank thereof) can therefore preferably be established via an external mains water kit by a hydraulic interposition of the mains water kit between the beverage maker, on the one hand, and the drinking water network, on the other hand.

The external mains water kit is here preferably also mechanically connectable or connected both to the beverage maker (in particular to its housing) and to the drinking water network to prevent any unintentional release of the mains water connector of the beverage maker from the drinking water network. For the mechanical connection between the mains water kit and the housing, the housing can have a receiver which is complementary to the mechanical connector of the mains water kit and in/at which the mechanical connector of the mains water kit can be fastened (in particular screwed, clamped, or clipped).

The mains water kit is likewise preferably electrically connectable or connected to the beverage maker. This makes it possible that the beverage maker (in particular the control device thereof) controls and/or regulates functions of the mains water kit, e.g. a (solenoid) valve and/or a flow regulator of the mains water kit with whose aid the water flow cross-section of said hydraulic connection, that is, the amount of water flowing through the mains water kit per time unit, can be set.

Further advantageously implementable features can be seen from claim 6.

It is also sufficient here to provide one of the two elements valve and flow regulator. A valve that is continuously adjustable with respect to its opening cross-section can also be provided instead of a binary valve (that is a valve only having an open position and a closed position) together with a flow regulator. The flow regulator can comprise or be an aperture.

Further advantageously implementable features can be seen from claims 7 to 9.

An individual sensor can also be used that is configured in combination as a presence and level sensor (cf. the following embodiment). A capacitive sensor is conceivable as such a combination sensor that e.g. detects a tank wall and/or detects whether there is water behind it or not. The sensor can output three different measurement values in analog or digital form. 1.=No tank present; 2: =Tank present or correctly inserted, but no water (i.e. tank empty or level below minimum); and 3.=Tank present or correctly inserted and sufficient water present. When an individual sensor is used, a microswitch or a magnet at the tank and a reed switch or a Hall sensor can sense the tank presence. The level can then e.g. be detected via a capacitive sensor, a float switch, an ultrasound sensor, or min/max contact electrodes.

Further advantageously implementable features can be seen from claim 10.

The connection sensor also additionally checks whether there is a mechanical connection (between the mechanical connector of the mains water kit, on the one hand, and the receiver complementary thereto at the housing of the beverage maker, on the other hand). The obtaining of drinking water from the drinking water network via the mains water kit and the inflow by means of the control device on the basis of signals of such a connection sensor can, for reasons of safety, only take place when not only the hydraulic connection is present, but also such a mechanical connection.

Different examples of functions and/or controls that can be implemented by means of the control device and of the above-described sensors and optionally by means of suitable programs in the memory of the control device are as follows.
1. If no connection sensor is present, the mains water kit is always actuated on a minimum detection of the level. If this minimum message does not disappear after a limit time (e.g. 10 seconds), "Fill water tank" appears on a display of the machine.
2. Switchover on the display: In contrast to 1., the message "Check mains water connection" can be output.
3. Auto detection: This can take place in variants of differing complexity. Only a detection of the electrical connection by e.g. actuating the valve and simultaneous current monitoring or additional monitoring of the fluid communication by a pressure switch in the machine that monitors the water inflow and senses the water pressure. The monitoring of the mechanical securing device can in turn take place via a microswitch or an electrical contact.

Further examples of functions and/or controls that can be implemented by means of the control device and of the above-described sensors and optionally by means of suitable programs in the memory of the control device are as follows.

If a presence sensor is connected to the control device, the first and/or second mode of operation can be blocked if it is determined that the water tank is not present in the housing of the beverage maker.

If one (or also two different) level sensor(s) is/are provided with whose aid levels within the water tank can be detected, two water levels can be defined: A minimum water level MIN and a maximum water level MAX within the water tank. If MIN is reached or fallen below, water can be refilled via the inflow by means of the control device for so long until MAX is reached in the tank (e.g. the control device can correspondingly actuate a connected mains water kit). Alternatively to this, a defined amount of drinking water can also be refilled via the inflow that is dimensioned such that the water level within the tank is always below MAX. It is equally possible only to refill drinking water from the drinking water network via the inflow when the control device via which the level sensor(s) determine(s) that a beverage is just being prepared in the beverage maker, that is, that water is currently being taken from the water tank. The water tank can therefore serve as a fillable buffer. Finally, if MAX is exceeded, an alarm can be triggered by means of suitable devices of the beverage maker (e.g. flashing indication in a display at the housing or alarm sound) and/or a further refilling of drinking water from the drinking water network can be blocked by means of the control device for so long until the water level in the tank has fallen to a defined fraction of MAX (e.g. 0.5×MAX) by a taking of water or a by a beverage preparation. A plurality of the aforesaid control possibilities can be implemented in a cumulative manner.

If a connection sensor is used, the presence of the fluid connection or a correct connection of the mains water kit to the beverage maker, on the one hand, and to the drinking water network, on the other hand, can be recognized. If this is the case and if it is additionally detected by the presence sensor that the water tank is present and correctly positioned in the housing of the beverage maker, both the first and second operating modes can be released by means of the control device.

Further advantageously implementable features can be seen from claim 11.

The water inlet in the housing of the beverage maker above the upper tank side is preferably configured such that the drinking water is not introduced into the tank interior along the vertical, that is at a slant, via it with a tank inserted into the housing (or into a tank receiver thereof). The water inlet or its air gap is here as a rule positioned above the maximum level height MAX in the tank. A slanted introduction of the inflowing drinking water against the inner wall is understood such that the inflowing drinking water falls through the air gap so that it (or the tangent at the water jet) is preferably incident on (or intersects) said inner wall at an oblique angle $\alpha<45°$, preferably $<20°$, preferably $<10°$.

Further advantageously implementable features can be seen from claims 12 and 13.

In accordance with these claims, the drip tray is preferably a part of the housing of the beverage maker and can be removed from this housing for emptying the waste water located in the drip tray. Such a drip tray does not, however, have to be provided if the overflow leads into the separate fluid drain of the beverage maker (this separate fluid drain is then configured and arranged for a defined leading off of overflowed water from the beverage maker).

An additional level sensor can be provided at the drip tray that determines the level in the drip tray and, if the tray is full or almost full, outputs an alarm signal or an indication (e.g. at a display of the beverage maker) "Drip tray full" (e.g. by means of the control device) and/or that blocks (e.g. by means of the control device) the further preparation of beverages by the beverage maker when the drip tray is about to overflow or is filled above a defined maximum level.

Additionally or alternatively, the drip tray itself can have a fluid drain over which waste water located in the drip tray is led off continuously (or on a reaching of the maximum level in the drip tray) from the drip tray (and thus from the beverage maker).

A mains water kit in accordance with the invention is described in claim 14.

A coffee machine in accordance with the invention can thus be a tank machine in its basic design. If the machine is to be operated at a mains water connection, the water can be filled via a mains water kit located outside the machine. The mains water kit can either be connected directly at an angle valve to the line network (drinking water network) of a domestic water supply or also via an interposed water filter.

Interfaces for the electrical and hydraulic connection to the mains water kit can be prepared as standard in the coffee machine. The electrical connector can connect the control of the machine to an inflow valve in the kit. The machine can also automatically recognize by the electrical connection whether a mains water kit is connected or not. Alternatively, a manual selection and setting can also be made possible via a/the user interface of the machine.

The hydraulic connector can provide a connection between the inflow valve (that is, the valve arranged in the mains water kit) and the tank inlet located in the housing of the machine. This hydraulic connection can take place via a plug-in connection. Such a plug-in connection can additionally be mechanically secured (for example via a screw connection), which prevents an unwanted separation of the housing of the machine and of the mains water kit. Such a separation could take place, for example, by moving the coffee machine away or by stumbling over an inflow tube.

The presence of the water tank in the coffee machine can be monitored by a sensor (presence sensor). It can thus be prevented that water is refilled when there is no tank in the machine. The level in the water tank can also be monitored by a level sensor (or by a combined presence and level sensor). It is also conceivable that one sensor each is used for the presence monitoring and for the level monitoring. If the water level drops below a minimum value, the level sensor can transmit a signal to the control device. The level sensor can thus e.g. serve the recognition of the residual amount (empty recognition) at which an already triggered product can still be reliably prepared and output. If this residual amount is fallen below, the machine can prompt the user to fill the tank (or, in a program controlled manner in the second mode of operation, can automatically take care of drinking water being introduced into the tank from the drinking water network). Such a signal can trigger time-controlled filling of the tank with a connected mains water kit. The control can thereupon open the inflow valve in the mains water kit for a certain time. So that the amount of water that has flowed into the tank in this time does not depend too much on the line pressure in the drinking water network, a flow regulator can be located in the inflow valve of the mains water kit or in the mains water kit. It keeps the flow relatively constant over a larger pressure range.

The flow regulator can be dimensioned such that water is in every case introduced faster from the drink water network into the tank than can be taken from the machine to prepare beverages. It is sufficient in this case if water is only refilled when a taking also simultaneously takes place. This has the advantage that the flow noises on the filling of the tank have the noise of a coffee grinder of the coffee machine and of the water pump of the coffee machine superposed and can thus hardly be perceived by the user any longer (preferred embodiment). It is, however, naturally also possible to refill water at any desired time.

If the water supply via the drinking water network is disrupted, e.g. by a non-opened angle valve, the machine can recognize this by the fact that the level sensor does not report the exceeding of the MIN mark in the water tank again after a short time after the opening of the inflow valve in the mains water kit. A corresponding message can be indicated at a display of the machine.

The filling of the water tank in the second mode of operation, that is, with drinking water from the drinking water network, can take place via a water inlet that is located above the tank. For hygienic reasons, an air gap can be present between this inlet and the tank and the inflowing water jet has to freely bridge it. The water jet here preferably enters into the tank interior at a slight angle so that it runs against an inner wall (side wall) of the water tank at a shallow angle and from there downward to the water surface of the water already in the tank. This has the advantage that much less noise and considerably reduced splashing are caused than if the water jet were to be directly incident (e.g. vertically) on the water surface.

If defects or malfunctions result in an overflowing of the tank, the water can run off into the drip tray when the overflow of the water tank is provided via a cross-section of sufficiently large dimensions. The drip tray can in turn be monitored via a level sensor (or can also be connected to a drain). To form the overflow, the tank can be configured in its front region (region of its handle) such that the water is conducted downwardly directly at the front tank wall (visible to the user). Alternatively, the overflow can also be attached to any other desired point of the tank and the water can flow into the tank envelope from which it can be led off to the front into the drip tray or into separate drain.

The present invention in particular provides the advantage that the water supply for the beverage preparation can take place in different manners. A simple conversion of a machine in accordance with the invention from a tank machine into a mains water machine and vice versa is possible if only interfaces for the electrical, hydraulic, and mechanical connection to the mains water kit described are provided as standard in the machine (e.g. at the housing thereof). The machine thus does not even have to be opened for the conversion. In addition, the machine has the advantage of quiet operation.

The present invention also in particular has the advantage (with respect to machines having a fixedly installed tank, i.e. a tank that cannot be removed) that lime scale deposits that form over time can be simply and reliably removed due to the manual removal of the tank. If there is no removal possibility for the tank, such deposits can only be removed with difficulty, which can represent a substantial risk. Germs are deposited at the surfaces and form a slime layer, the so-called biofilm, over time due to the storage of water in the tank. This biofilm may become noticeable in the form of an unpleasant odor and can also be harmful to the health. A reliable and thorough mechanical and chemical cleaning of a tank can, however, only be implemented with difficulty in the installed state. If the tank can be removed, however, as in the present invention, a manual cleaning of all corners and edges (e.g. also by a dishwasher is possible.

The modification or conversion from the state of a tank machine into the state of a mains water machine (in which the tank filling can then take place by means of the two already described operating modes) can take place by the following steps.

Establishing the electrical, mechanical, and hydraulic connection between the machine and the mains water kit (plug-in connections; interfaces at the rear of the machine can be used).

Connecting the mains water kit to the water connection at the construction side, either directly at the angle valve or via an interposed water filter (lime filter).

Switching the machine software (programs of the control device) from tank machine to mains water machine via the operator menu at the user interface of the machine. An independent recognition of a connected mains water kit by the control device or its software is also theoretically possible.

The switchover back to the tank machine can take place in the reverse order. A separation from the mains water network or drinking water network is not absolutely necessary in this process. It is sufficient to cut the electrical, hydraulic, and mechanical connection at the machine and, for safety reasons, to close the angle valve and the shut-off valve.

An embodiment will be described in the following with reference to a coffee machine as a beverage maker in which an external mains water kit is used (as part of the inflow of the coffee machine). There are shown.

Figure 1:
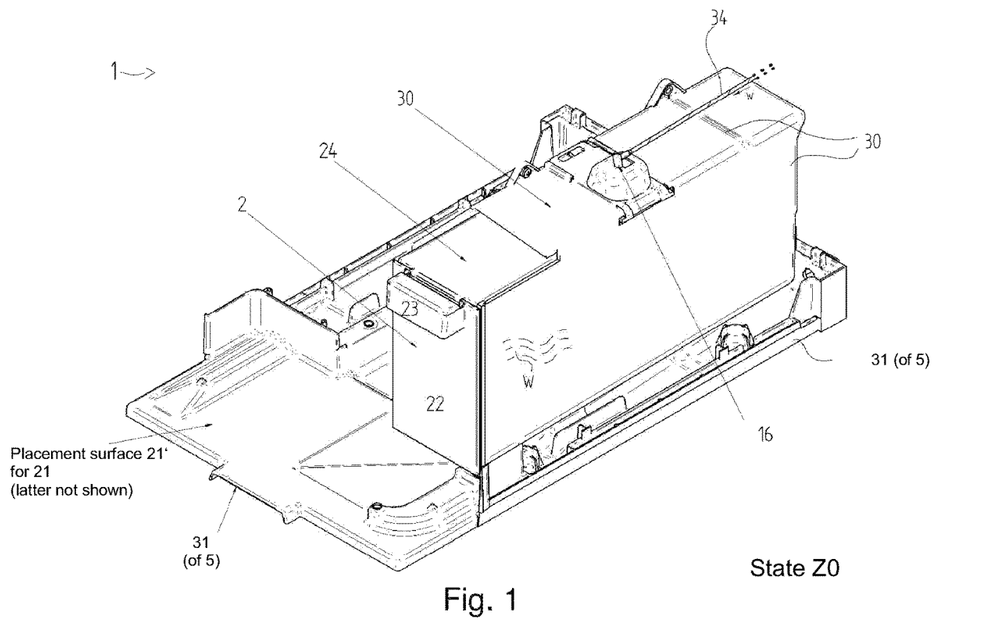
FIG. 1 a three-dimensional plan view of the front side of the coffee machine 1 in a state Z0 in which the machine 1 is not connected to the drinking water network T via the inflow 3.

FIG. 1 shows an oblique view of an electrically operated coffee machine 1 in accordance with the invention of which only the elements important to the invention are visible, namely inter alia a base group 31 (that represents a part of the housing 5 of the coffee machine 1) and a tank receiver 30 fixed on a section of the base group 31 and arranged on the latter. The tank receiver 30 is formed as a hollow shape that can be pushed from the front side of the coffee machine 1 (at the bottom left in the Figure) facing the user (not visible) in the horizontal direction of the water tank 2 into the tank receiver 30 toward the rear side of the machine 1. FIG. 1 shows a state in which the tank 2 has been completely pushed into the tank receiver 30 (water that may be present in the tank is indicated by the reference symbol W). As a comparison with FIG. 2 shows, FIG. 1 furthermore shows a state Z0 in which the coffee machine 1 is not connected via an inflow 3 (that partly comprises elements of the coffee machine 1 and partly elements of a mains water kit 7 external to the coffee machine and connectable to the coffee machine 1) to the drinking water network T of a building in which the coffee machine 1 is positioned.

A handle 23 of the tank 2 that projects over toward the user is formed at the upper end, that is, the end remote from the base group, at the front side 22 of the water tank 2 facing the user. A placement surface 21' is shown between this front side 22 and the front side of the base group 31 and a drip tray 21 of the machine 1 can be positioned section-wise on said placement surface beneath the handle 23 such that water W overflowing from the tank 2 over the handle 23 can run down at the front side 22 or the front of the tank 2 and can run into the drip tray 21 (cf. also FIG. 7 in this respect).

24 marks a cover of the tank 2 that is formed on the upper side of the tank 2 such that it can be folded up and/or removed and that extends from the front side of the machine 1 toward its rear side at the top right in FIG. 1 over the total tank length, with the cover 24 having a central opening 25 corresponding to the water inlet 16 viewed in the longitudinal tank direction or in the direction from the front side of the machine 1 toward the rear side of the machine 1 and here being only sectionally visible at the front side of the tank 2, that is not at the level of the water inlet 16 and also not at the rear side of the tank 2 or of the machine 1. The cover 24 that is formed along the total inner tank volume, that can be folded up and that is shown in the folded down state in FIG. 1 serves in the state of the tank 2 pulled out of the housing 5 of the machine 1 to allow the tank 2 to be filled with water manually by a user with an open cover 24 external to the machine 1 via an external vessel such as a measuring jug (not shown) (first mode of operation of the machine 1). In the pushed-in state of the tank 2, the cover 24 is, as shown in FIG. 1, forcibly closed (the tank 2 cannot otherwise be completely pushed into the tank receiver 30) so that in the position of the tank 2 shown in FIG. 1 only a filling of the tank 2 is made possible by leading in drinking water (inter alia via the water line 34 within the housing 5, cf. the arrow and also FIG. 2) into the water inlet 16 and from there via the opening 25 in the tank cover 24 that is not visible in FIG. 1 and that is arranged below the water inlet 16 into the tank interior (second mode of operation of the machine 1). It is, however, also sufficient only simply to use a removable cover (not shown). If this is then forgotten, it will not be recognized.

Figure 2:
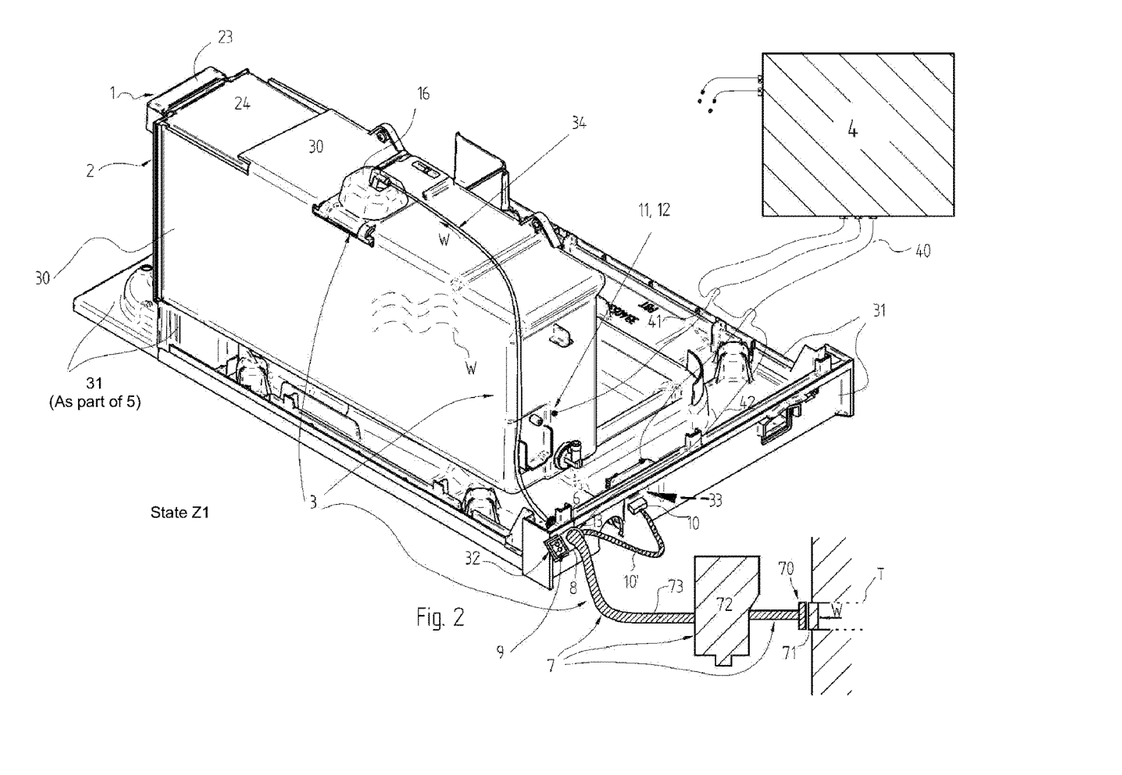
FIG. 2 a corresponding plan view (but of the rear side of the machine) in the state Z1 in which the machine 1 is connected to the drinking water network T via the inflow 3.
Figure 6:
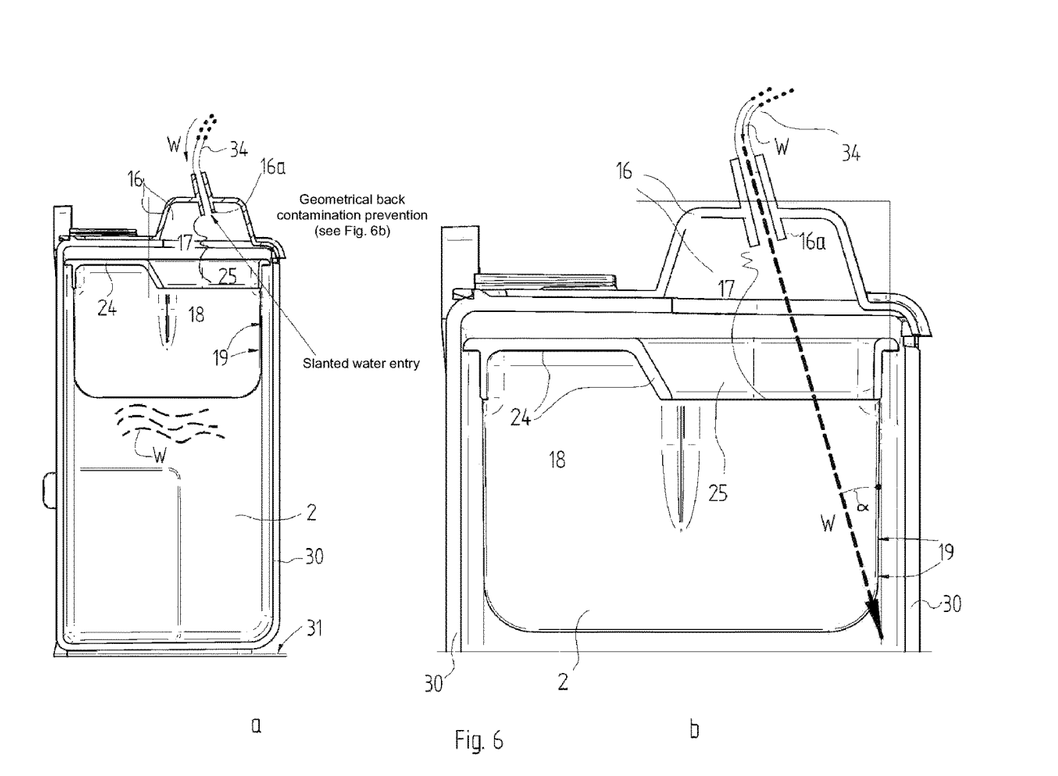
FIG. 6 a sectional view through the water tank 2 of the machine 1 that shows the design of the water inlet 16.

The oblique plane view of the machine 1 from the rear of FIG. 2 shows a state Z1 in which the beverage maker can be supplied with water W from the drinking water network T via the inflow 3 comprising elements of the beverage maker and via elements of the mains water kit 7 external to the beverage maker. The elements 25, 17, 16, 34 and 6 are parts (cf. also the following) of the inflow 3 as elements of housing 5 or within the housing 5 that belong to the machine 1. Those elements of the inflow 3 that do not belong to the machine 1, but rather to the external mains water kit 7 connecting the machine inter alia hydraulically to the drinking water network T are the elements 8, 73, 74, and 70 (cf. the following). The hydraulic connector 70 of the kit 7 is mechanically fixed to a complementary hydraulic connector 71 of the drinking water network T in the state Z1. Water W from the drinking water network T thus flows over the hydraulic plug-in connection 70, 71 into the mains water kit 7, from there over the hydraulic plug-in connection 6, 8 into the machine 1 or into the housing 5 thereof and within the housing 5 first over the hydraulic connector 6 into the water line 34 disposed inside the housing to the water inlet 16 (the water line 34 is hydraulically connected to the water inlet 16 or is fixed to the latter). The water W finally flows into the interior of the tank 2, cf. FIG. 6, over the air gap 17 of the water inlet 16 (cf. FIG. 6)—the water inlet 16 positioned above the tank 2 can be considered as a replaceable element of the tank receiver 30 of the housing 5 of the machine 1—and over the opening 25 in the cover 24.

Figure 3:
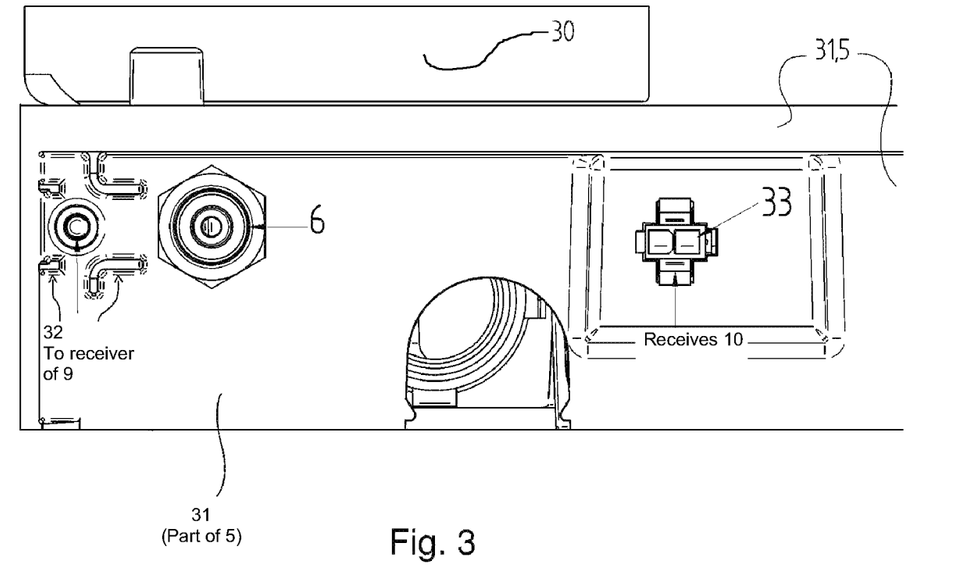
FIG. 3 a plan view of the connectors on the rear side of the housing 5 of the machine 1.
Figure 4:
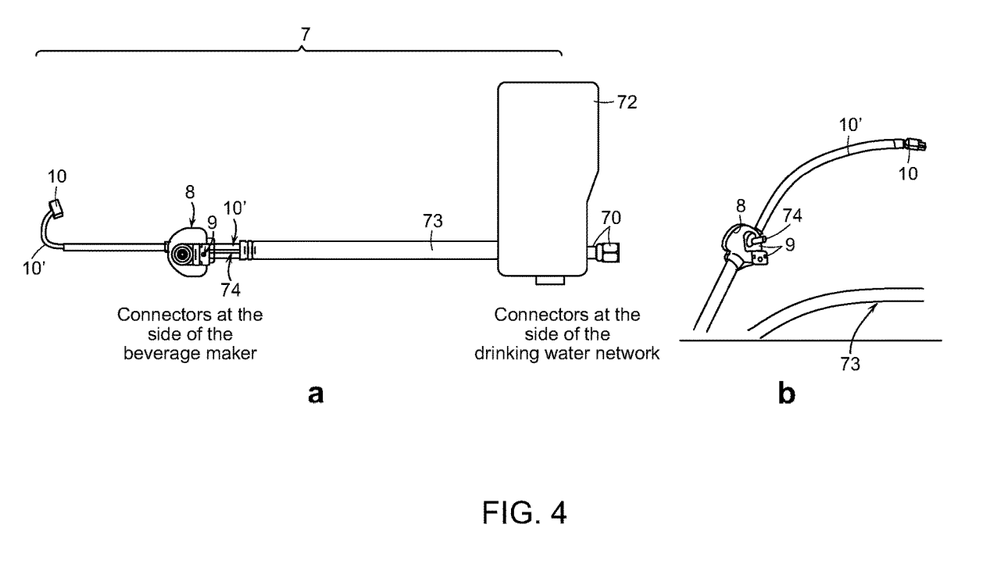
FIG. 4 an outer view of the mains water kit 7.

FIG. 2 shows the machine 1, the kit 7, and the water network T in the completely connected state, that is, both hydraulically and electrically and mechanically, and with the following sensor system and the following control possibilities (cf. also FIGS. 3 and 4 with respect to the connections or connectors). A control device 4 is provided within the housing 5 which is provided with a data memory, which is configured as a microcontroller, and with which the machine 1 controls the already described modes of operation and equally the connected mains water kit 7. For this purpose, the control device 4 makes use of the measurement values transmitted by the sensors 11, 12, and 13 over the bidirectional data and control lines 41 and 42 (and optionally sets parameters of said sensors over said bidirectional lines to control the sensors) and additionally uses the instantaneous setting parameters of the valve 14 and of the flow regulator 15 transmitted over the likewise bidirectional data and control line 10' and the plug 10 from the solenoid vale 14 and from the flow regulator 15 of the mains water kit 7 (cf. FIG. 5). Control signals can also be transmitted over the line 10' from the control device 4 to the valve 14 and to the flow regulator 15 for setting the desired water flow through the mains water kit 7. In addition, the electrical line 10' serves the power supply of the mains water kit through the machine 1 via the plug 10 and the socket 33.

Figure 5:
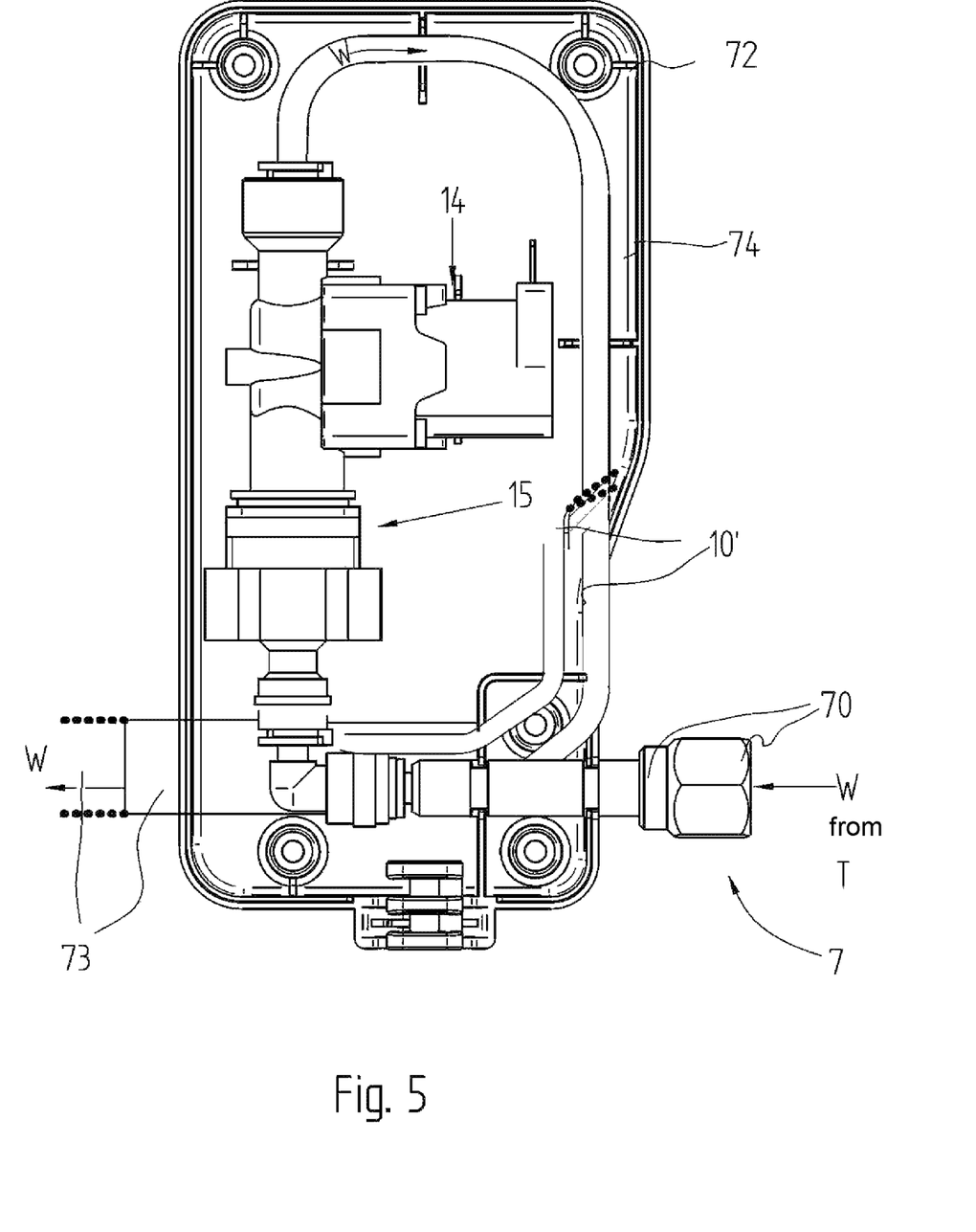
FIG. 5 a view into the housing 72 of the mains water kit 7 and to the elements of the mains water kit located therein.

The control device 4 is additionally connected over the bidirectional data and control line 40 to a connector socket 33 formed as a part of the housing 5. The plug 10 of the kit 7 is plugged into the connector socket 33 and is connected over the line 10' electrically to the valve 14 and to the flow regulator 15 of the kit 7 (FIGS. 4 and 5).

The control device 4 is equally electrically connected via the line 41 to the combination sensor 11, 12, with the latter comprising a presence sensor 11 and a level sensor 12. It can be determined by the presence sensor 11 whether the tank 2 is correctly positioned in the receiver 30, that is, within the housing 5 of the machine 1. The instantaneous filling level of water W within the tank 2 can be determined by the level sensor 12 (that is, in particular whether the maximum level MAX has been reached or exceeded and whether the minimum level M has been reached or fallen below).

Finally, the control device 4 is electrically connected to the connection sensor 13 via the line 42. While the combination sensor 11, 12 is positioned at the rear tank side, the sensor 13 is a combined pressure and conductivity sensor that is positioned at the rear machine side such that a pressure is only exerted on this sensor on a complete, fluid-tight closing of the hydraulic connection 6, 8. In addition, the machine 1, the kit 7, and the hydraulic connector 71 of the drinking water network T are suitably configured such that the sensor 13 only contacts ground electrically when both the hydraulic connection 6, 8 between the machine 1 and the kit 7 and the hydraulic connection 70, 71 between the kit 7 and the network T are correctly closed. A check can thus be made by the control device 4 by means of the line 42 and of the sensor 13 whether the fluid connection between the hydraulic connector 6 of the housing 5, on the one hand, and the hydraulic connector 71 of the building, on the other hand, is completely closed. Such a monitoring for leak tightness does not have to be provided, however. Only a monitoring of the refilling (i.e. monitoring whether specific levels are reached in predetermined times) can thus e.g. also take place. Example: If the MIN signal does not disappear during filling after a predefined time, an error signal and/or alarm signal is/are output.

The elements 9 and 32 represent a mechanical connection with whose help the kit 7 can be mechanically fixed to the housing 5 or to the base group 31 thereof. See also FIG. 3 in this respect: 32 represents a mechanical housing receiver as an element of the housing 5 that is configured as complementary to the mechanical connector 9 that is an element of the mains water kit 7 (cf. FIG. 4) via which the end of the kit 7 at the machine side or at the housing side can be clipped or screwed into the housing receiver 32 and can thus be fixed to the housing 5.

FIG. 3 additionally shows the hydraulic connector 6 of the housing 5 (that is shaped for a shaped-matched, sealing reception of the hydraulic connector 8 of the kit 7 configured complementary thereto) and the electrical connector socket 33 in the housing 5 or in its base group 31 that is configured for the shape-matched reception of the plug 10 of the kit 7 configured complementary thereto and for establishing the electrical connection between the machine 1 or its control device 4 and the kit 7 (or the elements 14 and 15 to be controlled therein).

FIGS. 4 and 5 show the structure of the external mains water kit 7 in detail. The elements 14 and 15 arranged in the housing 72 of the kit 7 are configured for the setting of the amount of drinking water W flowing through the kit 7 per time unit (that is, from the hydraulic connector 70 of the kit 7 at the building side to the hydraulic connector 8 of the kit 7 at the machine side). 14 is a binary solenoid valve that, switched magnetically, can only adopt the two positions "open" and "closed". The energy supply of the valve 14 takes place via the data, control, and power line 10' after connection thereof via the plug 10 and the socket 33 to the machine 1 (the elements 33, 10, and 10' are suitably formed for this purpose). The basic structure of such a binary valve 14 is familiar to the skilled person. To set the flow amount per time unit with an open solenoid valve 14, the flow regulator is therefore provided upstream of the valve 14 in the form of an aperture 15 that is continuously variable with respect to its degree of opening (or is also replaceable).

The drinking water W entering from the drinking water network T or from its hydraulic connector 71 over the complementary connector 70 of the kit 7 thus flows over the aperture 15 through the valve 14 into the Teflon tube 74 that is positioned downstream of the valve 14 in the housing 72 and exits the housing 72 within the flexible fabric tube 73 (alternatively also called a line receiver). Both the Teflon tube or the corresponding hydraulic line 74 for the drinking water supply and the electrical line 10' serving as the energy supply and as the bidirectional data and control line are guided within the line receiver 73 from the housing 72 up to the end of the kit 7 at the side of the beverage maker.

The end of the line 74 at the side of the beverage maker 74 is connected in a fluid-tight manner to the hydraulic connector 8 of the kit 7 while the line 10' opens into the plug 10. As FIGS. 4a and 4b show, the fabric tube 73 with the line 74 (hydraulic) and 10' (electrical) located therein opens into a plastic housing of the hydraulic connector 8 for this purpose. The latter is connectable in a fluid-tight manner via the plastic housing of the connector 8 to the complementary hydraulic connector 6 of the housing 5. At the side of the plastic housing disposed opposite the mouth of the fabric tube 73, the electrical line 10' exits the plastic housing of the hydraulic connector 8 to open into the plug 10 at the end at the side of the beverage maker.

FIGS. 6a and 6b (the latter as a magnification) show a cross-section perpendicular to the longitudinal tank axis and at the level of the water inlet 16 through the water tank 2. The water inlet 16 in the upper side of the tank receiver 30 has a bell-shaped section which projects toward the upper side of the machine 1 remote from the tank and in whose upper side the water line 34 leading within the housing to the hydraulic connector 6 opens. Corresponding to the water inlet 16 or to its bell-shaped section (and thus also corresponding to the mouth of the line 34), an opening 25 is formed in the cover 24 of the tank 2, with the opening cross-section of this opening approximately coinciding with the clear inner cross-section of the bell-shaped bulge of the water inlet 16. Water W flowing over the line 34 and the inlet 16 in the tank receiver 30 downwardly (that is, toward the base group 31) thus falls through an air gap 17 of the inlet 16 after exiting the mouth region 16a of the water inlet 16, with this air gap 17 extending, viewed toward the base group 31, through the opening 25 into the interior of the tank 2. The mouth 16a of the line 34 or of the inlet 16 toward the opening 25 or toward the tank interior is here configured and orientated such that the inflowing water W falling through the air gap 17 does not flow along the air gap 17 vertically into the tank 2, but rather at a slant (dashed arrow in FIG. 6b). In other words, the water W introduced under pressure exits the mouth 16a such that it is incident against a side all or inner wall 19 of the tank 2 after falling through the opening 25 into an upper region 18 of the interior of the water tank at a small slant angle α of here approximately 15°.

The falling through of the air gap 17 thus reliably geometrically prevents any back contamination from water supplied from the drinking water network T due to germs possibly occurring within the tank in the filling with water. The impact of the inflowing water at small slant angle α on the side wall 19 (brushing incidence of the water) in the upper region 18 of the tank interior prevents an unpleasant noise development almost up to the complete filling of the tank 2 with drinking water W that would otherwise occur if the inflowing water were to fall vertically downwardly or onto the surface of the water collection already located in the tank 2. (The impact surface can, however, also be above the MAX level).

Figure 7:
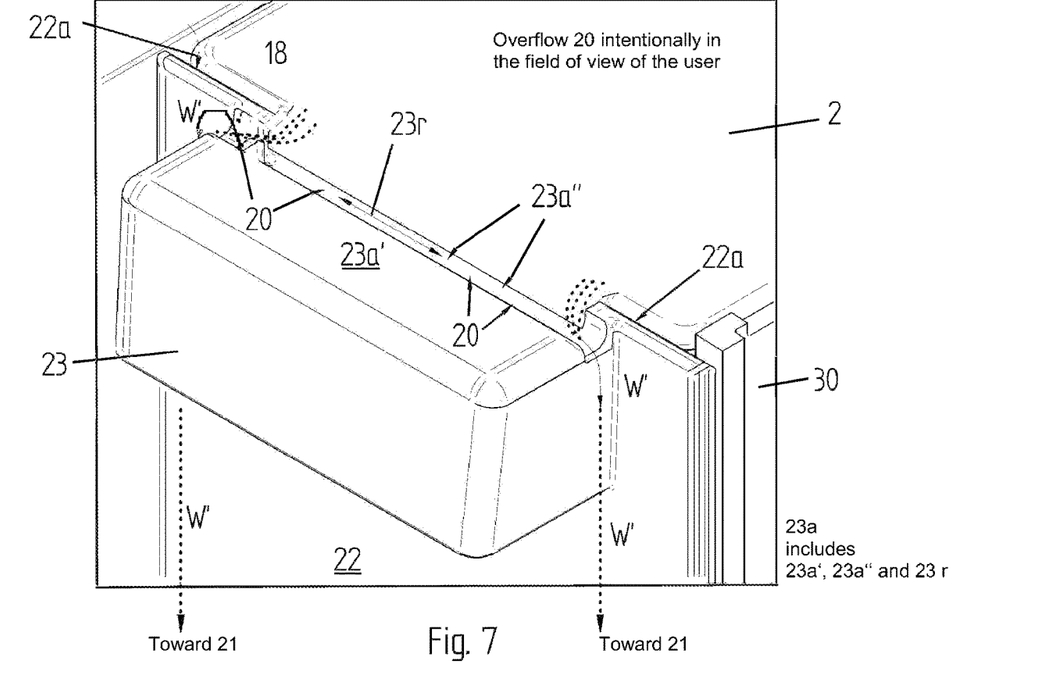
FIG. 7 an oblique view from the front (side of the machine facing the user) of the water tank 2 that shows the overflow 20.

FIG. 7 finally shows (cf. FIG. 1) in a magnified view the front side 22 of the water tank 2 facing the user of the machine 1. A handle 23 projects at the upper end of the front side 22 from the tank 2 in the direction toward the user (not shown) as follows: The upper side 23a of the handle 23 is shaped and positioned as a planar, horizontally aligned surface. Viewed vertically with respect to the base group 31, this upper side 23a is positioned slightly below the upper edge 22a of the front side 22 of the tank 2 likewise extending horizontally. Viewed horizontally and perpendicular to the longitudinal tank axis (that extends horizontally from the front side of the machine to its rear side), that is, viewed along the longitudinal axis of the handle 23 extending transversely to the longitudinal tank axis and likewise horizontally, the upper edge 22a of the front water tank side 22 has an interruption or the upper edge 22a is lowered, viewed vertically, to the level of the upper side 23a of the handle 23.

This interruption thus forms an overflow 20: If the filling level in the water tank 2 increases up to the level of the upper side 23a, water starts to overflow from this overflow over the upper handle side 23a as the water level continues to increase and to flow down at the front side 22 of the tank in the direction toward the base group 31 (water W'). Since that section 23a' of the handle 23 that faces the user is slightly elevated with respect to the section 23a" of the upper side 23a facing the tank interior viewed in the direction of the vertical (toward the top), a groove 23r is formed on the upper side 23a between the upper edge 22a, on the one hand, and the surface section 23a' of the upper side 23a of the handle 23 facing the user, on the other hand, and water overflowing in said groove can flow off at both sides toward the handle ends viewed in the direction of the longitudinal handle axis. The outflowing water W' then flows downwardly outside the interruption, that is, below the stationary upper edge sections 22a at the handle 23, and at the front side 22 of the tank 2. With a suitable positioning of the drip tray 21 (not shown) at the lower end, that is the end facing the base group, of the front side 22, the overflowing water W' is collected in the drip tray 21.

Such an overflow 20 has the advantage that the user of the machine 1 can immediately perceive the overfilling of the tank 2, with simultaneously the handle sections of the handle 23 used by the user and facing toward the user remaining free of any water wetting.

The invention claimed is:

1. A beverage maker comprising
a water tank suitable for being filled with water, wherein the water is suitable for preparing a beverage by the beverage maker,
wherein the beverage maker is configured as connectable to a drinking water network via an inflow,
wherein
the water tank is suitable for being
i) manually removed from the beverage maker by a user of the beverage maker in a state in which the beverage maker is connected to the drinking water network via the inflow; or
ii) filled with the water selectively by manual filling of water by a user of the beverage maker or by introducing drinking water from the drinking water network via the inflow;
wherein the beverage maker comprises a control device which is configured to determine whether the beverage maker is connected to the drinking water network via the inflow or not,
wherein, in the connected state, the control device makes it possible to switch over between
a first mode of operation of the beverage maker in which the manual filling of the water into the water tank takes place by the user, and
a second mode of operation of the beverage maker in which the intro-duction of the drinking water from the drinking water network takes place via the inflow into the water tank.

2. The beverage maker in accordance with claim 1, wherein
the water tank removable in this manner is suitable for being cleaned outside the beverage maker after its removal.

3. The beverage maker in accordance with claim 1, wherein
in a state in which the beverage maker is not connected to the drinking water network via the inflow, only the first mode of operation, but not the second mode of operation, of the beverage maker is made possible by means of the control device.

4. The beverage maker in accordance with claim 1, wherein
a housing of the beverage maker within which the water tank is accommodated or is suitable for being accommodated, with the inflow having a hydraulic connector attached to the housing;
and by a mains water kit which is connectable or connected to this hydraulic connector, on the one hand, and to the drinking water network, on the other hand, and which is preferably positionable or positioned outside the housing.

5. The beverage maker in accordance with claim 4, wherein
the mains water kit comprises:
a hydraulic connector that is configured as complementary to the hydraulic connector of the housing for establishing a fluid connection between the mains water kit, on the one hand, and the water tank, on the other hand, via the two hydraulic connectors;

a mechanical connector for fixing the mains water kit to the housing; and an electrical connector for the electrical connection of the mains water kit to the beverage maker, in particular to a control device thereof.

6. The beverage maker in accordance with claim 4, wherein the mains water kit comprises a valve, that enables or blocks a flow of water through the mains water kit depending on the switch position; or in that the mains water kit comprises a flow regulator.

7. The beverage maker in accordance with claim 6, wherein the valve or the flow regulator is configured or controllable or regulatable such that more water is introduced per time unit from the drinking water network via the mains water kit and the inflow into the water tank during the preparation of a beverage by the beverage maker than is removed from the water tank due to the preparation of the beverage.

8. The beverage maker in accordance with claim 1, wherein the water tank is suitable for being removed or taken away from the beverage maker; and in that a presence sensor is present in or at the beverage maker which is suitable for determining whether the water tank is present in or at the beverage maker, or not.

9. The beverage maker in accordance with claim 1, wherein one or more level sensors which are suitable for detecting the water level currently present in the water tank or which are suitable for detecting whether a predefined water level or predefined water levels has been reached, exceeded or fallen below.

10. The beverage maker in accordance with claim 1, wherein a connection sensor is present in or at the beverage maker which is suitable for determining whether the beverage maker is connected to the drinking water network (T) via the inflow or not.

11. The beverage maker in accordance with claim 1, wherein a water inlet that leads into the water tank and that has an air gap through which drinking water taken from the drinking water network has to flow before or during the flowing into the water tank.

12. The beverage maker in accordance with claim 1, wherein the an overflow of the water tank via which, on the overflowing of the water tank from the latter, overflowing water is suitable to be led off either into a drip tray of the beverage maker or into a separate fluid drain of the beverage maker which is not identical to the beverage outlet of the beverage maker for the prepared beverage.

13. The beverage maker in accordance with claim 12, wherein the overflow is formed at the front side of the water tank facing a user of the beverage maker and is shaped such that the overflowing water is visible to the user.

* * * * *

UNITED STATES PATENT AND TRADEMARK OFFICE
CERTIFICATE OF CORRECTION

| | |
|---|---|
| PATENT NO. | : 11,399,655 B2 |
| APPLICATION NO. | : 15/998550 |
| DATED | : August 2, 2022 |
| INVENTOR(S) | : Joel Eicke et al. |

It is certified that error appears in the above-identified patent and that said Letters Patent is hereby corrected as shown below:

On the Title Page

Item (54), and in the Specification, Column 1, Line 1, should read:
"A BEVERAGE MAKER"

Item (73), should read:
"Assignee: WMF GROUP GMBH"

Signed and Sealed this
Twentieth Day of September, 2022

Katherine Kelly Vidal
*Director of the United States Patent and Trademark Office*